(12) United States Patent
Ribardo, Jr. et al.

(10) Patent No.: US 9,451,166 B1
(45) Date of Patent: Sep. 20, 2016

(54) SYSTEM AND METHOD FOR IMAGING DEVICE MOTION COMPENSATION (71) Applicant: Raytheon Company, Waltham, MA (US)

(72) Inventors: Thomas G. Ribardo, Jr., Gerland, TX (US); Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/666,884

(22) Filed: Mar. 24, 2015

(51) Int. Cl.
*H04N 5/228* (2006.01)
*H04N 5/232* (2006.01)
*G06T 7/00* (2006.01)

(52) U.S. Cl.
CPC ........... *H04N 5/2328* (2013.01); *G06T 7/0018* (2013.01); *G06T 7/0044* (2013.01); *H04N 5/23254* (2013.01); *G06T 2207/30244* (2013.01)

(58) Field of Classification Search
CPC .................. H04N 5/23254; H04N 5/2328
See application file for complete search history.

(56) References Cited

U.S. PATENT DOCUMENTS

| 7,860,550 B2* | 12/2010 | Saracen | A61B 6/0457 378/209 |
| 8,934,023 B2* | 1/2015 | Webb | H04N 5/2328 348/208.7 |
| 2011/0221900 A1* | 9/2011 | Reich | F16M 11/04 348/144 |

* cited by examiner

*Primary Examiner* — Gary C Vieaux
(74) *Attorney, Agent, or Firm* — Schwegman Lundberg & Woessner, P.A.

(57) ABSTRACT

Generally discussed herein are systems, apparatuses, and methods for. In one or more embodiments, a method can include recording imaging device external orientation parameters of a rigidly mounted imaging device, capturing a reference frame using the imaging device in an orientation corresponding to the recorded parameters, capturing a later frame after the reference frame, correlating the later frame to the reference frame to determine pixel orientation in the reference frame relative to pixel orientation in the later frame, determining an imaging device movement required to return the imaging device back to the orientation associated with the recorded imaging device external orientation parameters based on the determined pixel orientation in the reference frame relative to the pixel orientation in the later frame, and updating the imaging device external orientation parameters to account for the determined imaging device movement in accord with the imaging device external orientation parameters.

20 Claims, 5 Drawing Sheets

SYSTEM AND METHOD FOR IMAGING DEVICE MOTION COMPENSATION

TECHNICAL FIELD

Embodiments discussed herein generally relate to image motion compensation for a stationary imaging device.

BACKGROUND

A number of methods exist to extract camera orientation from ground control points or relative to other camera views of the same scene. These are computationally costly and time consuming.

A number of image stabilization techniques exist to stabilize shaky video. These methods generally rely on re-sampling the image data, which results in additional computation. Re-sampling can reduce image quality, which can hinder further processing of the image data, such as when the data is to be used for the determination of a three-dimensional (3D) structure. Further, the image stabilization methods typically expect the camera to be in motion.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to camera motion compensation. One or more embodiments may help in providing a more accurate 3D point cloud representation of an object in images produced by a generally static array of imaging devices. One or more embodiments may help in providing an imaging device motion compensation feature technique that can, for example, help compensate for a shaky hand, or that can help compensate for undesired camera motion when taking a panoramic picture (e.g., stitching images together).

Imaging devices used for the generation of point-clouds are often mounted in areas prone to vibrations. Motion due to vibration or shifting of the imaging device during data collection can result in a mis-calibration of imaging device orientation relative to the scene. This in turn can cause errors in image analysis, such as in producing a 3D point cloud representation of an object in the image (e.g., frame). Application of camera motion compensation to an image can help compensate for this error.

In one or more embodiments, imaging device orientation parameters are determined and recorded (e.g., imaging device orientation is calibrated). A reference frame is captured by the imaging device closely following imaging device orientation calibration (e.g., while the imaging device is still in the calibrated position). The image captured is a reference frame that represents the field of view (FOV) the imaging device is supposed to be capturing. This frame and or features extracted from the frame are correlated to one or more successive frames to determine if the FOV the imaging device is capturing is substantially the same FOV as it was calibrated to capture. If the FOV has changed, the imaging device has likely moved. Unexpected motion of the imaging device can be determined based on observed pixel-shift and/or rotation of a current frame relative to a previously captured reference frame. The pixel-shift and/or rotation can be used in with an imaging device focal length, and/or other internal imaging device parameters to estimate the change in the imaging device's external orientation. The determined change in orientation can then be applied to the orientation of previous imaging device orientation parameters to update the recorded orientation of the imaging device before further analysis of the frame. The imaging device external orientation parameters can refer to external camera orientation parameters, such as azimuth, elevation, pitch, latitude, longitude, rotation angle, yaw, roll, and/or a combination thereof.

Analysis of the frame can include producing a 3D point cloud of an object in the FOV of the imaging device. Any number of methods may be applied for the 3D point cloud construction process, however if an imaging device (e.g., an imaging device in an array of imaging devices) changes position, such as due to vibration, wind, or structural shift, the 3D point cloud construction will suffer degradation, if not fail entirely. Thus, the orientation and position of an imaging device should be accurately characterized for use in the extraction of 3D structures from imagery. An imaging device mounted in/on a structure can be affected by vibration and other disturbances that can inadvertently perturb orientation of the imaging device. While a number of methods exist to retrieve the imaging device external orientation parameters, the methods can be time consuming and computationally expensive, and some methods can require unique and/or costly hardware. One or more of the systems and techniques discussed herein addresses the issue of maintaining accurate records of the imaging device orientation parameters. Embodiments discussed herein can be accomplished with reduced computational effort and can be accomplished faster as compared to previous solutions. These systems and methods can account for motion of the imaging device, such as can be used for 3D-structure extraction or other frame analysis.

Figure 1:
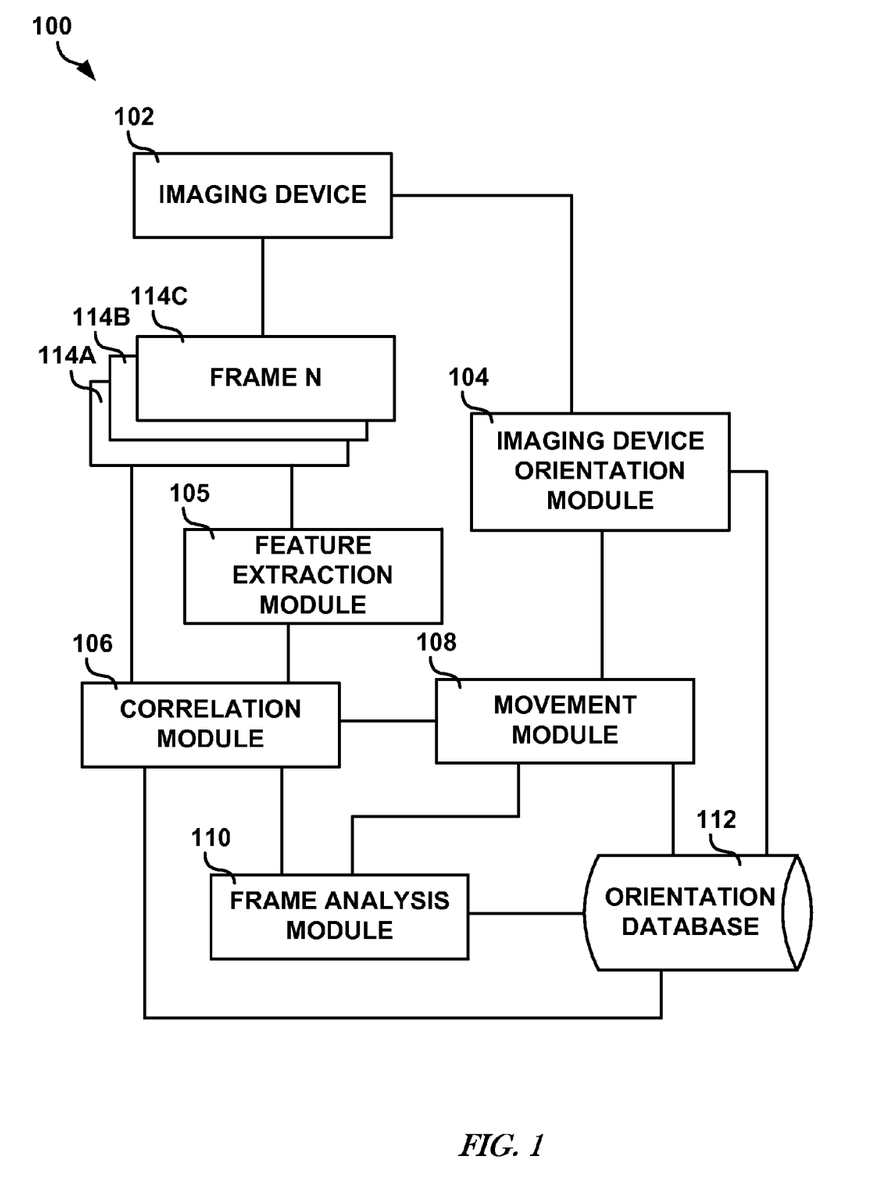
FIG. 1 illustrates, by way of example, a block diagram of an embodiment of a system for imaging device motion compensation.

FIG. 1 illustrates, by way of example, a block diagram of an embodiment of a system 100 for imaging device motion compensation. The system 100 as illustrated includes one or more imaging devices 102, an imaging device orientation module 104, a correlation module 106, a movement module 108, a frame analysis module 110, and an orientation database 112. The system 100 can optionally include a feature extraction module 105. The orientation parameters and image data can be used by a frame analysis module 110.

The imaging device 102 can include a single imaging device or a plurality of imaging devices, such as can be organized in an array or in a cohesive unit. Each imaging device can produce frame data 114A, 114B, and/or 114C (i.e. a sequence of images, such as video). The imaging device 102 can produce frame data at a constant frame rate or a non-constant rate (e.g., on demand by a user) of a scene corresponding to an FOV of the imaging device 102. The imaging device 102 can be a video camera, non-video camera, or other imaging device capable of creating the frame data 114A-C. The frame data 114A-C can be produced with periodic time intervals between frames, random time intervals between frames, or on demand, such as by a user commanding the imaging device to capture a picture. While FIG. 1 depicts three frame data 114A-C any number of frame data, two or greater, can be captured and analyzed using the system 100. The imaging device 102 can capture the frame data 114A while the imaging device 102 is still in the calibrated position (i.e. the position as recorded at the imaging device orientation module 104), such as to produce a reference frame. The frame data 114B-C can be subsequent frames (i.e. frame data corresponding to frames captured after the reference frame was captured).

The imaging device orientation module 104 can be used to capture the external orientation of the imaging device 102. For example, the imaging device orientation module 104 can provide a user interface (UI) through which a user can enter external orientation parameters of imaging device 102 manually. The imaging device orientation module 104 can, additionally or alternatively, perform at least a portion of the external orientation calibration automatically, such as by implementing a geometric bundle-adjustment technique that can include manual or automated tie points. Geometric bundle-adjustment techniques refine imaging device and structural parameter estimates to find a set of parameters that accurately predicts the locations of points in a set of images. Bundle-adjustment techniques attempt to minimize a total re-projection error of pixels based on the imaging device parameters.

Using bundle adjustment, given a set of frames from different collection geometries common "tie-points" are identified between the frames (either manually or through an automated process). The tie-point in one frame generally corresponds to the same point in another frame a 3D-geometric space (e.g., Euclidean-space). The position in the 3D-space of the point can be estimated.

The estimation can be accomplished by re-projecting an estimate (e.g., initially a guess) of the 3D-position of the tie point back into each imaging device's view through a projection-model (which takes 3D points projects them into 2D-image-space). The error (e.g., difference) between the re-projected location and the measured-location of the tie-point for frame can be determined. Based on the rate of change in error, an adjustment of the parameters of the projection-models of each imaging device (e.g., focal-length, imaging device orientation, position, optical-distortion, etc.) as well as the unknown 3D-geometric-location of the tie point. This process can be repeated iteratively until the error (differences) between the measured-tie-point position and the location of the re-projected tie-point is minimized or below a specified threshold. The end result is an enhanced projection-model (e.g., imaging device model) as well as the location of the tie-points. This process can also be performed without absolute knowledge of the tie-point locations in 3D space in which case the tie-point are generally referred to as "control-points".

The external orientation parameters define a location and orientation of the imaging device 102 in space. External orientation parameters can include, for example, azimuth, elevation, pitch, latitude, longitude, rotation angle, yaw, roll, and/or a combination thereof.

The imaging device orientation module 104 can also provide a UI (e.g., a same or different UI as the one used for the external orientation parameters UI) to capture the internal parameters of the imaging device 102 from a user or the imaging device 102. Internal parameters include focal length, zoom, detector pitch, size of focal plane, distortion parameters, such as a radial lens distortion.

The feature extraction module 105 can detect pixels corresponding to one or more aspects of a frame that can likely be unique in the scene. The feature extraction module 105 can implement edge, corner, blob, shape, or ridge detection, for example. The feature extraction module 105 can implement an off-the-shelf feature extraction technique, such as Speeded Up Robust Features (SURF) or Scale-Invariant Feature Transform (SIFT). An entirety of a frame can be used as a feature. The feature extraction module 105 can provide the correlation module 106 with details regarding the unique pixels (i.e. the extracted feature(s)) from a frame that the correlation module 106 can use to correlate the extracted feature(s) to the reference frame data 114A.

The correlation module 106 can correlate entire frames of data 114B-C to the reference frame of data 114A or can correlate a subset of data from the frames of data 114B-C to a corresponding subset of data from the reference frame, such as can include correlating only likely unique feature(s) (as received from the feature extraction module 105). The correlation module 106 implements an image registration technique and determines if and how much the FOV of the imaging device 102 has changed relative to the FOV in the reference frame data 114A. For example, the correlation module 106 can use frame data (e.g., all or just a subset of the frame data) from the frame data 114B and determine where (in terms of likelihood) the corresponding frame data appears in the reference image. The correlation module 106 can then determine what shift, in terms of the number of pixels (e.g., whole and/or fractions of pixels) that need to be traversed in the x and y directions, and/or rotation are required to best match the frame data 114B to the reference image 114A. This shift and rotation data can be provided to the movement module 108 or the frame analysis module 110. The shift and rotation data can be recorded at the orientation database 112. The shift and rotation data can be associated with the frame data 114A-C in which the corresponding shift and/or rotation were first detected.

In one or more embodiments, the correlation performed by the correlation module 106 can be done periodically (i.e. every second, minute, hour, or other time interval), such as to not perform the correlation on every frame of data produced by the imaging device 102. In one or more embodiments, the correlation performed by the correlation module 106 can be done on every frame of data captured by the imaging device 102. The correlation can be between the most recent frame captured and a most recent reference frame captured. For example, if the correlation module 106 determined that a pixel shift and/or rotation has occurred in correlating a later frame to the reference frame, then the later frame can be designated a reference frame with which subsequent frames will be correlated.

The correlation module 106 can determine if an object is in motion, and can remove features (e.g., from a list of features extracted) corresponding to the moving object prior to performing correlation. The correlation module 106 is to determine if an FOV of the imaging device has changed and, if it has changed, the pixel shift and rotation related to that change. Because a moving object can occlude parts of an FOV that are normally visible from the perspective of the imaging device 102 and the moving object does not necessarily move in a manner that is consistent with inadvertent imaging device motion, correlating images with a moving object can negatively alter results of correlation. Removing a feature corresponding to such a moving object from a correlation can help increase the accuracy of the correlation.

The correlation module 106 can implement a block correlation technique that finds where one or more blocks of pixels from the reference frame most likely appear in the later frame. Block correlation can improve correlation results by focusing on areas of common motion and/or ignoring regions outside the blocks.

In block correlation, it is assumed that the pixels within a specified block have the same motion profile. For a given block in a frame, a block correlation technique searches for the displacement of the best matching region in another frame. A frame can be broken into sets of pixel called blocks. This process is sometimes referred to as "gridding" the frame. Each block is then correlated to another frame to estimate how far that block has moved between the two frames. If the imaging device shifts linearly resulting in the entire scene moving the blocks would all show common motion. If the imaging device rolls about its viewing axis you blocks show circular motion relative to each other. If there is a moving object in the FOV and the camera is stationary, the block(s) including pixels corresponding to the moving object show motion but other blocks not corresponding to the moving object would show no motion.

The movement module 108 can transform the shift and rotation data from the correlation module 106 from image space to physical space. The movement module 108 can determine what shift and rotation in the imaging device 102 occurred in order to make the pixels of the image shift in the manner determined by the correlation module 106. Shifts in the FOV of the imaging device 102 in pixel space are highly correlated with the external orientation of the imaging device 102 in physical space, thus a change in the pixel space of the imaging device 102 can be used to determine the change in the orientation of imaging device 102 in physical space.

The movement module 104 can apply the determined changes in the external orientation of the imaging device 102 to a recorded external orientation of the imaging device that corresponds to the external orientation of the imaging device 102 when the reference image 114A was captured. The updated external orientation of the imaging device 102 can be recorded in the orientation database 112 and/or provided to the frame analysis module 110. The updated external orientation of the imaging device 102 can be associated with corresponding frame data provided by the imaging device 102. This association can allow the frame analysis module 110 to associate the recorded external orientations of the imaging device 102 with appropriate frame data. For example, the recorded external orientation corresponding to the reference frame data 114A can be associated with all frame data produced between the reference frame data 114A and the frame data corresponding to a next update of the external orientation of the imaging device 102.

The frame analysis module 110 can perform one or more operations on the frame data 114A-C using the external orientation data and/or shift and rotation data, such as can be retrieved from the database 112 or received from the movement module 108 or correlation module 106. In one or more embodiments, the frame analysis module 110 can perform three dimensional point cloud processing on the frame data 114A-C. The shift and rotation data and/or the external orientation data can be used by the frame analysis module to compensate for a shift in the imaging device 102, such as to provide a more accurate three dimensional point cloud representation of an object in the frame data 114A-C. In one or more embodiments, frame analysis module 110 can perform an image stabilization technique on the frame data 114A-C. The shift and rotation data and/or the external orientation data can be used by the frame analysis module 110 to make an image being displayed on a display device appear less shaky or more stable than it would without the image stabilization technique.

The orientation database 112 can include records of external and/or internal camera orientation parameters, the frame data 114A-C, and/or data indicating associations between the orientation parameters and the frame data 114A-C.

Figure 2A:
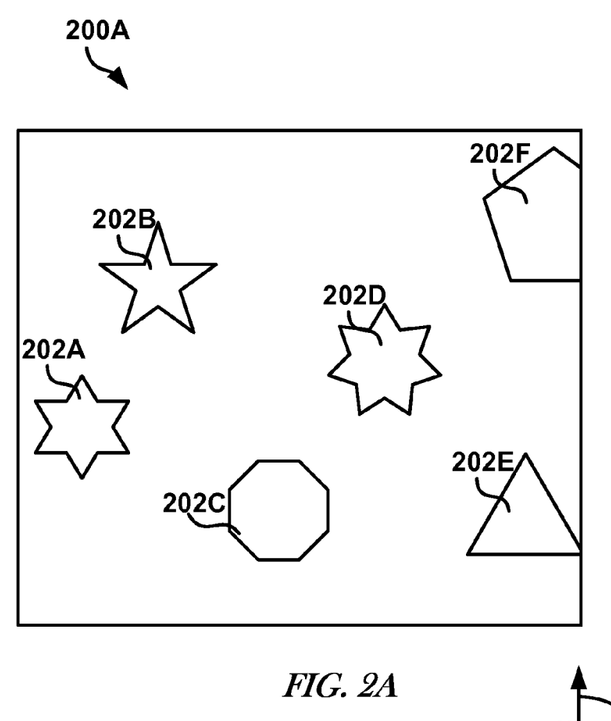
FIG. 2A illustrates, by way of example, a reference frame captured by the imaging device.
Figure 2B:
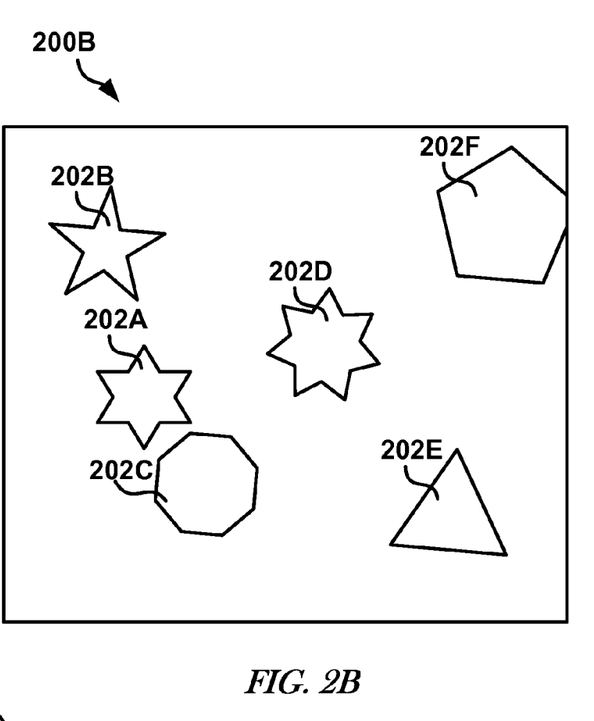
FIG. 2B illustrates, by way of example, a subsequent frame captured by the imaging device after capturing the reference frame of FIG. 2A.

FIG. 2A illustrates, by way of example, a reference frame 200A captured by the imaging device 102 (FIG. 1). FIG. 2B illustrates, by way of example, a subsequent frame 200B captured by the imaging device 102 after capturing the reference frame 200A of FIG. 2A.

The reference frame 200A includes pixels corresponding to objects 202A, 202B, 202C, 202D, 202E, and 202F. The subsequent frame 200B includes pixels corresponding to the same objects 202A-F. The objects 202A-F in the reference frame 200A appear in different locations than the objects 202A-F in the subsequent frame 200B.

The feature extraction module 105 (FIG. 1) can extract features from the frames 200A-B, such as pixel data corresponding to the objects 202A-F. The correlation module 106 (FIG. 1) can determine if any of the objects 202A-F have moved between the frames and can remove any objects that have moved. In the example of FIGS. 2A and 2B the object 202A has moved. The correlation module 106 can remove pixels corresponding to the object 202A from the correlation. The correlation module 106 can correlate the remaining or all features (provided by the feature extraction module 105) of the frame 200A to the frame 200B. The result of the correlation performed by the correlation module 106 can include an estimate of the number of pixels the objects 202A-F (e.g., with or without the pixels corresponding to the object 202A) have shifted between the frame 200A and the frame 200B. In the example shown, the objects 202B-F have shifted a number of pixels in the x-direction, the y-direction, and have rotated in the 0-direction. This shift and rotation data can be provided to the movement module 108 (FIG. 1), the frame analysis module 110 (FIG. 1), and/or the orientation database 112 (FIG. 1).

Figure 3:
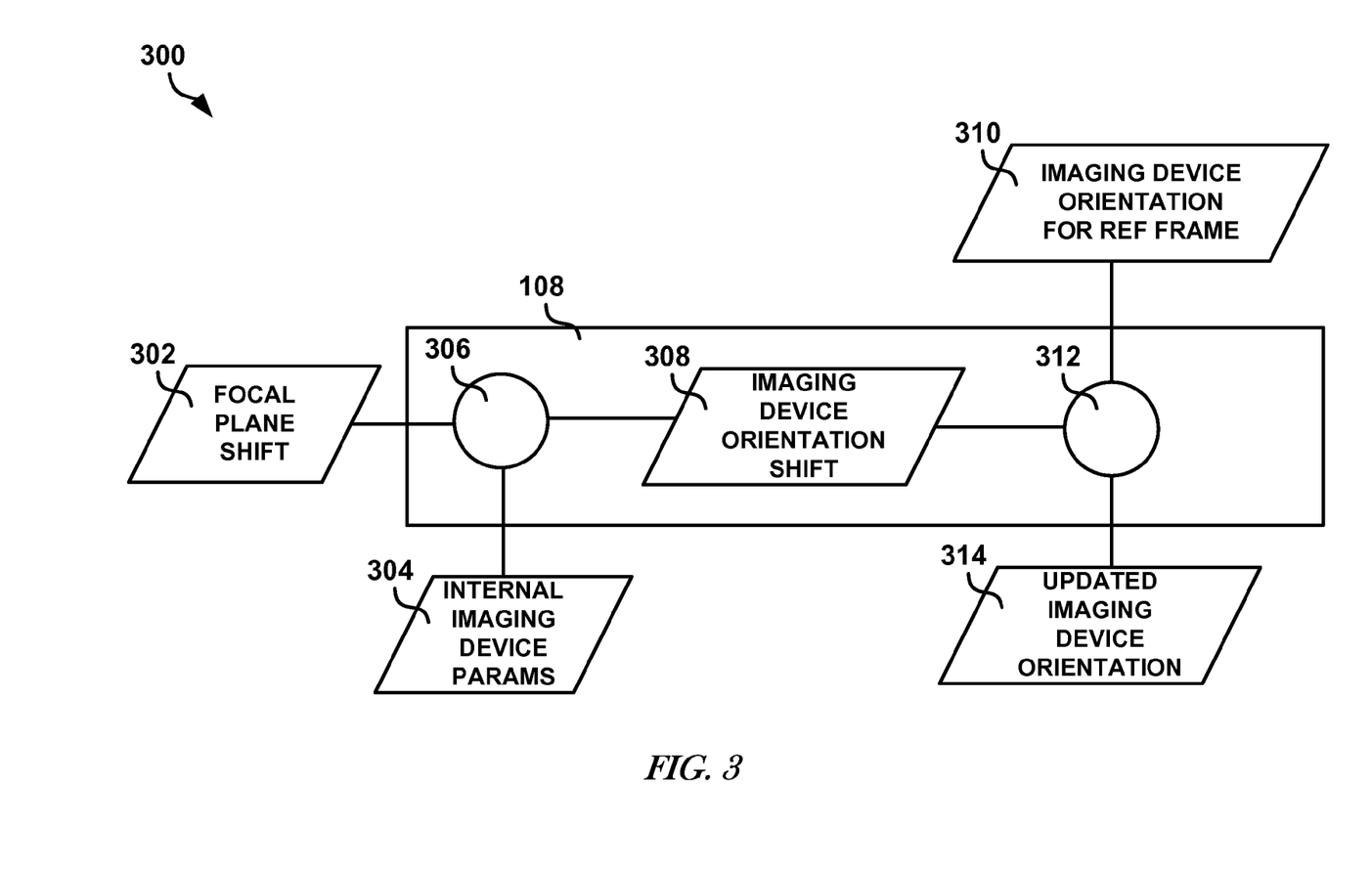
FIG. 3 illustrates, by way of example, a data flow diagram of an embodiment of an imaging device motion compensation scheme.

FIG. 3 illustrates, by way of example, a data flow diagram of an embodiment of an imaging device motion compensation scheme 300. The scheme 300 as illustrated includes receiving, at the movement module 108, focal plane shift data 302 and internal camera parameter data 304. The focal plane shift data 302 includes the shift data (e.g., the x-direction, y-direction, and/or 0-direction shift data) from the correlation module 106, such as can be provided by the correlation module or retrieved from the database 112. The internal camera parameter data 304 can be provided by the imaging device orientation module 104 or can be retrieved from the database 112.

The movement module 108 can perform a transform on the focal plane shift data 302 to map the data 302 to a physical space, such as to produce imaging device orientation shift data 308. The transform can be performed by the transformation module 306 and can be performed using the internal imaging device parameter data 304. A transform module 312 of the movement module 108 can receive the camera orientation shift data 308 and data 310 corresponding to a camera orientation at the time of capturing the reference frame data 114A. The transform module 312 can produce updated imaging device external orientation data 314 imaging device external orientation shift data 308 and the imaging device external orientation data 310 for the most recent reference frame. The imaging device orientation shift data 308 and/or the imaging device orientation for the reference frame data 310 can be retrieved from the database 112. The imaging device orientation data 310 for the reference frame can be provided by the imaging device orientation module 104. The updated imaging device external orientation data 314 can be provided to the database 112 or the frame analysis module 110.

Figure 4:
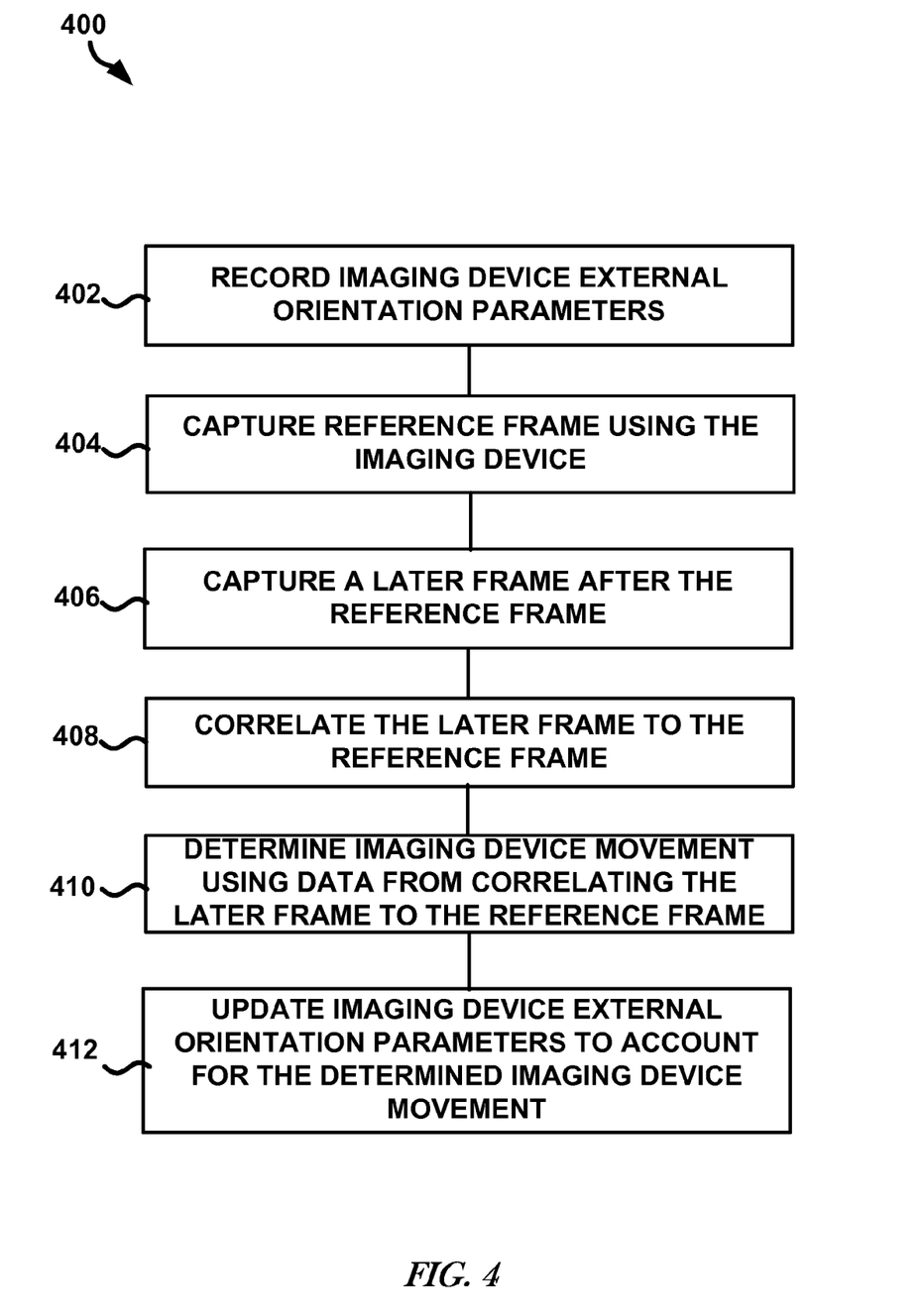
FIG. 4 illustrates, by way of example, a flow diagram of an embodiment of a method for imaging device motion compensation.

FIG. 4 illustrates, by way of example, a flow diagram of an embodiment of a method 400 for imaging device motion compensation. The method 400 as illustrated includes: recording imaging device external orientation parameters, at operation 402; capturing reference frame using the imaging device, at operation 404; capturing a later frame (e.g., a subsequent frame) after the reference frame, at operation 406; correlating the later frame to the reference frame, at operation 408; determining imaging device movement using data from correlating the later frame to the reference frame, at operation 410; and updating imaging device external orientation parameters to account for the determined imaging device movement, at operation 412.

The imaging device can be a rigidly mounted imaging device. The operation at 404 can be performed using the imaging device in an orientation corresponding to the recorded parameters. The operation at 406 can be performed to determine pixel orientation in the reference frame relative to pixel orientation in the later frame. The imaging device movement determined at operation 410 can be an imaging device movement required to return the imaging device back to the orientation associated with the recorded imaging device external orientation parameters based on the determined pixel orientation in the reference frame relative to the pixel orientation in the later frame. The operation at 412 can include updating the imaging device external orientation parameters to account for the determined imaging device movement required to return the imaging device back to the orientation associated with the imaging device external orientation parameters. The method 400 can further include performing an operation on the later frame using the updated imaging device external orientation parameters.

The external orientation parameters can include latitude, longitude, elevation, azimuth, yaw, roll, and/or pitch. The method 400 can further include calibrating the imaging device external orientation prior to recording the imaging device external orientation parameters. Calibrating the camera orientation includes using a geometric bundle adjustment technique that calibrates the orientation to one or more tie points. The operation at 408 can include correlating the later frame to the reference frame periodically. The operation at 408 can include correlating the later frame to the reference frame for each frame captured after the reference frame.

One or more advantages of the systems and methods discussed herein can include computational speed. The systems and methods discussed herein can be computationally faster than alternative approaches currently available. This can be at least partially because no additional tie-points or ground control points are required. Simple registration techniques can be used to determine the pixel shift and rotation as in the present disclosure. Another advantage can include no re-sampling of data as is typical in other current techniques. Another advantage can include not requiring costly hardware (e.g., an accelerometer, Gyroscope, a positional encoder, o strain sensitive device, among others) to monitor for an unexpected change in the camera orientation. The systems or methods discussed herein can help in providing the ability to track an induced error over time and measure/quantify external forces placed on the camera support structure.

Figure 5:
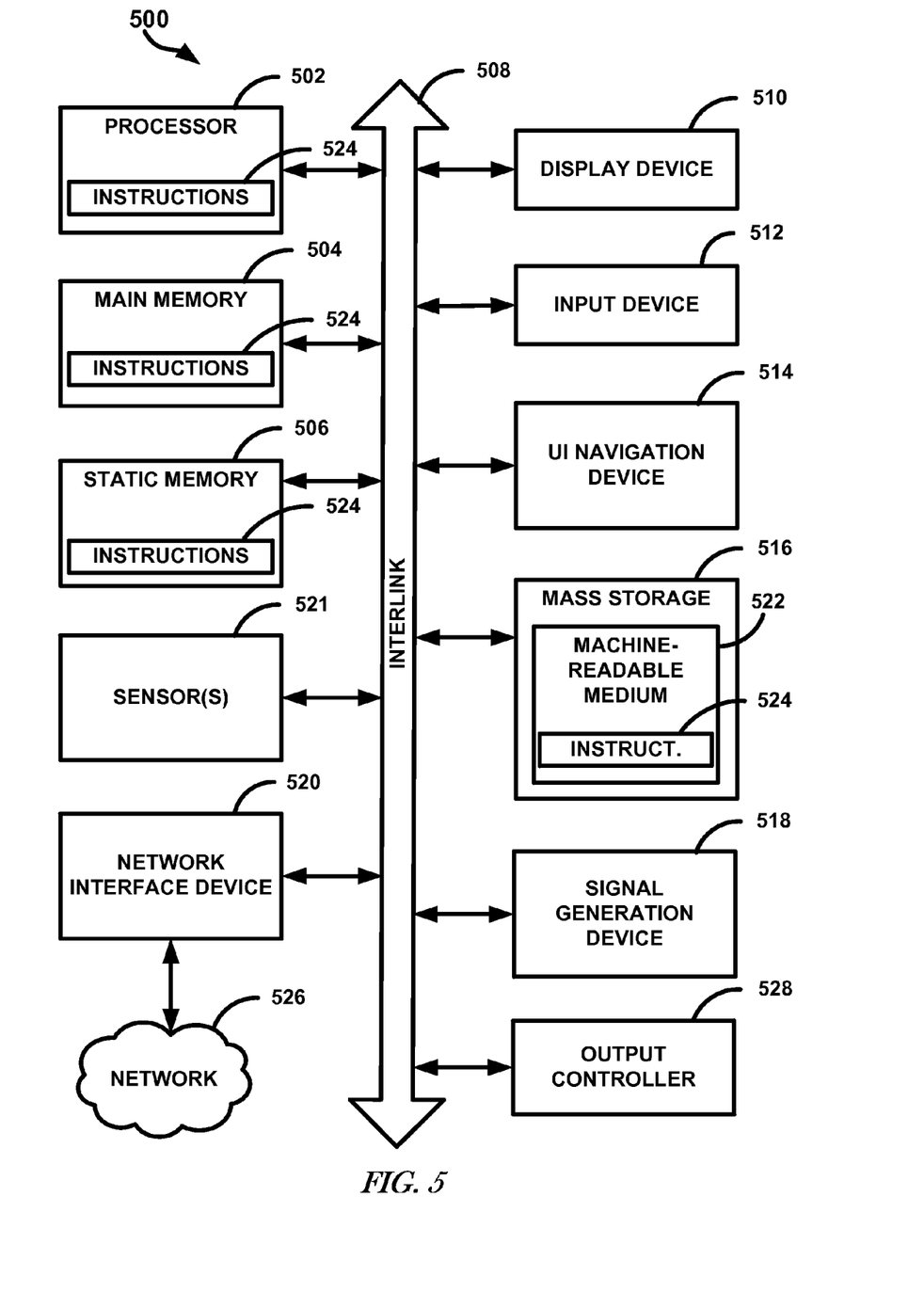
FIG. 5 illustrates, by way of example, a block diagram of an embodiment of a machine upon which one or more processes or operations (e.g., methods) discussed herein may be performed.

FIG. 5 illustrates, by way of example, a block diagram of an embodiment of a machine 500 upon which one or more processes or operations (e.g., methods) discussed herein may be performed. The imaging device 102, imaging device orientation module 104, feature extraction module 105, correlation module 106, movement module 108, frame analysis module 110, the orientation database 112, the transform module 306, and/or the transform module 312 can include one or more of the items of the machine 500. In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 500 can include a hardware processor 502 (e.g., a central processing unit (CPU), a graphics processing unit (GPU), a hardware processor core, or any combination thereof), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 can include a machine readable medium 522 on which is stored one or more sets of data structures or instructions 524 (e.g., software) embodying or utilized by any one or more of the process or functions described herein. The instructions 524 can also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 can constitute machine readable media.

While the machine readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by the machine 500 and that cause the machine 500 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

EXAMPLES AND NOTES

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use a processor to implement a plurality of modules, the modules comprising an imaging device orientation module to capture external orientation parameters of a rigidly mounted imaging device, a correlation module to receive a reference frame captured by the imaging device when the imaging device is in an orientation corresponding to the external orientation parameters, receive a later frame captured by the imaging device after the reference frame was captured, and determine a pixel shift of pixels in the later frame relative to pixels in the reference frame, a movement module to receive the determined pixel shift, determine, using the determined pixel shift, an imaging device movement required to return the imaging device back to an orientation corresponding to the external orientation parameters, and produce updated imaging device external orientation parameters that account for the determined imaging device movement required to return the imaging device back to the orientation associated with the imaging device external orientation parameters, and a frame analysis module to perform one or more operations on the later frame using the updated imaging device external orientation parameters.

Example 2 can include or use, or can optionally be combined with the subject matter of Example 1, to include or use, wherein the external orientation parameters include an azimuth, elevation, and pitch of the imaging device relative to a point in the field of view of the imaging device.

Example 3 can include or use, or can optionally be combined with the subject matter of at least one of Examples 1-2, to include or use, wherein the orientation module is to calibrate the imaging device orientation prior to determining the imaging device external orientation parameters.

Example 4 can include or use, or can optionally be combined with the subject matter of Example 3, to include or use, wherein calibrating the imaging device orientation includes using a bundle adjustment technique to calibrate the imaging device orientation to one or more tie points.

Example 5 can include or use, or can optionally be combined with the subject matter of at least one of Examples 1-4, to include or use, wherein the correlation module is to correlate the later frame to the reference frame periodically.

Example 6 can include or use, or can optionally be combined with the subject matter of at least one of Examples 1-5, to include or use, wherein the correlation module is to correlate the later frame to the reference frame for each frame captured after the reference frame.

Example 7 can include or use, or can optionally be combined with the subject matter of at least one of Examples 1-6, to include or use, wherein the correlation module is to remove pixels corresponding to a moving object in the later frame prior to correlating the later frame with the reference frame.

Example 8 can include or use, or can optionally be combined with the subject matter of at least one of Examples 1-7, to include or use, a feature extraction module to locate likely unique portions of the reference frame and provide pixel data corresponding to the likely unique portions to the correlation module and wherein the correlation module is to correlate only the likely unique portions of the reference frame to the later frame.

Example 9 can include or use, or can optionally be combined with the subject matter of at least one of Examples 1-8, to include or use, wherein the frame analysis module is to extract a three-dimensional point cloud of an object in the reference frame and the later frame using the external orientation parameters and the updated external orientation parameters.

Example 10 can include or use subject matter (such as an apparatus, a method, a means for performing operations, or a machine readable memory including instructions that, when performed by the machine, can configure the machine to perform acts), such as can include or use recording imaging device external orientation parameters of a rigidly mounted imaging device, capturing a reference frame using the imaging device in an orientation corresponding to the recorded parameters, capturing a later frame after the reference frame, correlating the later frame to the reference frame to determine pixel orientation in the reference frame relative to pixel orientation in the later frame, determining an imaging device movement required to return the imaging device back to the orientation associated with the recorded imaging device external orientation parameters based on the determined pixel orientation in the reference frame relative to the pixel orientation in the later frame, updating the imaging device external orientation parameters to account for the determined imaging device movement required to return the imaging device back to the orientation associated with the imaging device external orientation parameters, and performing an operation on the later frame using the updated imaging device external orientation parameters.

Example 11 can include or use, or can optionally be combined with the subject matter of Example 10, to include or use, wherein the external orientation parameters include latitude, longitude, elevation, azimuth, and pitch.

Example 12 can include or use, or can optionally be combined with the subject matter of at least one of Examples 10-11, to include or use calibrating the imaging device external orientation prior to recording the imaging device external orientation parameters.

Example 13 can include or use, or can optionally be combined with the subject matter of Example 12, to include or use, wherein calibrating the camera orientation includes using a bundle adjustment technique that calibrates the orientation to one or more tie points.

Example 14 can include or use, or can optionally be combined with the subject matter of at least one of Examples 10-13, to include or use, wherein correlating the later frame to the reference frame is performed periodically.

Example 15 can include or use, or can optionally be combined with the subject matter of at least one of Examples 10-14, to include or use, wherein correlating the later frame to the reference frame includes correlating the later frame to the reference frame for each frame captured after the reference frame.

Example 16 can include or use subject matter (such as an apparatus, a method, a means for performing operations, or a machine readable memory including instructions that, when performed by the machine, can configure the machine to perform acts), such as can include or use record imaging device external orientation parameters of a rigidly mounted imaging device, capture a reference frame using the imaging device in an orientation corresponding to the recorded parameters, capture a later frame after the reference frame, correlate the later frame to the reference frame to determine pixel orientation in the reference frame relative to pixel orientation in the later frame, determine an imaging device movement required to return the imaging device back to the orientation associated with the recorded imaging device external orientation parameters based on the determined pixel orientation in the reference frame relative to the pixel orientation in the later frame, update the imaging device external orientation parameters to account for the determined imaging device movement required to return the imaging device back to the orientation associated with the imaging device external orientation parameters, and extract a three-dimensional point cloud of an object in the reference frame and the later frame using the imaging device external orientation parameters and the updated imaging device external orientation parameters.

Example 17 can include or use, or can optionally be combined with the subject matter of Example 16, to include or use instructions, which when executed by the machine, configure the machine to remove pixels corresponding to a moving object in the later frame prior to correlating the later frame with the reference frame.

Example 18 can include or use, or can optionally be combined with the subject matter of at least one of Examples 16-17, to include or use instructions, which when executed by the machine, configure the machine to locate likely unique portions of the reference frame and provide pixel data corresponding to the likely unique portions to the correlation module and wherein the correlation module is to correlate only the likely unique portions of the reference frame to the later frame.

Example 19 can include or use, or can optionally be combined with the subject matter of at least one of Examples 16-18, to include or use, wherein the instructions for correlating the later frame to the reference frame include instructions, which when executed by the machine, configure the machine to correlate the later frame to the reference frame periodically.

Example 20 can include or use, or can optionally be combined with the subject matter of at least one of Examples 16-19, to include or use, wherein the instructions for correlating the later frame to the reference frame include instructions, which when executed by the machine, configure the machine to correlate the later frame to the reference frame for each frame captured after the reference frame.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a processor to implement a plurality of modules, the modules comprising:
   an imaging device orientation module to capture external orientation parameters of a rigidly mounted imaging device;
   a correlation module to receive a reference frame captured by the imaging device when the imaging device is in an orientation corresponding to the external orientation parameters, receive a later frame captured by the imaging device after the reference frame was captured, and determine a pixel shift of pixels in the later frame relative to pixels in the reference frame;
   a movement module to receive the determined pixel shift, determine, using the determined pixel shift, an imaging device movement required to return the imaging device back to an orientation corresponding to the external orientation parameters, and produce updated imaging device external orientation parameters that account for the determined imaging device movement required to return the imaging device back to the orientation associated with the imaging device external orientation parameters; and
   a frame analysis module to perform one or more operations on the later frame using the updated imaging device external orientation parameters.

2. The system of claim 1, wherein the external orientation parameters include an azimuth, elevation, and pitch of the imaging device relative to a point in the field of view of the imaging device.

3. The system of claim 2, wherein the orientation module is to calibrate the imaging device orientation prior to determining the imaging device external orientation parameters.

4. The system of claim 3, wherein calibrating the imaging device orientation includes using a bundle adjustment technique to calibrate the imaging device orientation to one or more tie points.

5. The system of claim 1, wherein the correlation module is to correlate the later frame to the reference frame periodically.

6. The system of claim 1, wherein the correlation module is to correlate the later frame to the reference frame for each frame captured after the reference frame.

7. The system of claim 1, wherein the correlation module is to remove pixels corresponding to a moving object in the later frame prior to correlating the later frame with the reference frame.

8. The system of claim 1, further comprising a feature extraction module to locate likely unique portions of the reference frame and provide pixel data corresponding to the likely unique portions to the correlation module and wherein the correlation module is to correlate only the likely unique portions of the reference frame to the later frame.

9. The system of claim 1, the frame analysis module is to extract a three-dimensional point cloud of an object in the reference frame and the later frame using the external orientation parameters and the updated external orientation parameters.

10. A method comprising:
    recording imaging device external orientation parameters of a rigidly mounted imaging device;
    capturing a reference frame using the imaging device in an orientation corresponding to the recorded parameters;
    capturing a later frame after the reference frame;
    correlating the later frame to the reference frame to determine pixel orientation in the reference frame relative to pixel orientation in the later frame;
    determining an imaging device movement required to return the imaging device back to the orientation associated with the recorded imaging device external orientation parameters based on the determined pixel orientation in the reference frame relative to the pixel orientation in the later frame;

updating the imaging device external orientation parameters to account for the determined imaging device movement required to return the imaging device back to the orientation associated with the imaging device external orientation parameters; and performing an operation on the later frame using the updated imaging device external orientation parameters.

11. The method of claim 10, wherein the external orientation parameters include latitude, longitude, elevation, azimuth, and pitch.

12. The method of claim 11, further comprising calibrating the imaging device external orientation prior to recording the imaging device external orientation parameters.

13. The method of claim 12, wherein calibrating the camera orientation includes using a bundle adjustment technique that calibrates the orientation to one or more tie points.

14. The method of claim 10, wherein correlating the later frame to the reference frame is performed periodically.

15. The method of claim 10, wherein correlating the later frame to the reference frame includes correlating the later frame to the reference frame for each frame captured after the reference frame.

16. A non-transitory computer readable storage device including instructions, which when executed by a machine, configure the machine to:

record imaging device external orientation parameters of a rigidly mounted imaging device;

capture a reference frame using the imaging device in an orientation corresponding to the recorded parameters;

capture a later frame after the reference frame;

correlate the later frame to the reference frame to determine pixel orientation in the reference frame relative to pixel orientation in the later frame;

determine an imaging device movement required to return the imaging device back to the orientation associated with the recorded imaging device external orientation parameters based on the determined pixel orientation in the reference frame relative to the pixel orientation in the later frame;

update the imaging device external orientation parameters to account for the determined imaging device movement required to return the imaging device back to the orientation associated with the imaging device external orientation parameters; and extract a three-dimensional point cloud of an object in the reference frame and the later frame using the imaging device external orientation parameters and the updated imaging device external orientation parameters.

17. The storage device claim 16, further comprising instructions, which when executed by the machine, configure the machine to remove pixels corresponding to a moving object in the later frame prior to correlating the later frame with the reference frame.

18. The storage device of claim 16, further comprising instructions, which when executed by the machine, configure the machine to locate likely unique portions of the reference frame and provide pixel data corresponding to the likely unique portions to the correlation module and wherein the correlation module is to correlate only the likely unique portions of the reference frame to the later frame.

19. The storage device of claim 16, wherein the instructions for correlating the later frame to the reference frame include instructions, which when executed by the machine, configure the machine to correlate the later frame to the reference frame periodically.

20. The storage device of claim 16, wherein the instructions for correlating the later frame to the reference frame include instructions, which when executed by the machine, configure the machine to correlate the later frame to the reference frame for each frame captured after the reference frame.

* * * * *

UNITED STATES PATENT AND TRADEMARK OFFICE
CERTIFICATE OF CORRECTION

PATENT NO. : 9,451,166 B1
APPLICATION NO. : 14/666884
DATED : September 20, 2016
INVENTOR(S) : Ribardo, Jr. et al.

Page 1 of 1

It is certified that error appears in the above-identified patent and that said Letters Patent is hereby corrected as shown below:

On the Title Page

In item (72), in "Inventors", in Column 1, Line 1, delete "Gerland," and insert --Garland,--, therefor In item (22), in "Filed", in Column 1, Line 1, after "2015", insert --¶(65) Prior Publication Data
US 2016/0286110 A1 Sep. 29, 2016--

In the Specification

In Column 5, Line 45, delete "104" and insert --108--, therefor

In Column 6, Line 49, delete "0-direction." and insert --θ-direction.--, therefor In Column 6, Line 59, delete "0-direction" and insert --θ-direction--, therefor Signed and Sealed this
Twentieth Day of March, 2018

Andrei Iancu
*Director of the United States Patent and Trademark Office*